Patented Feb. 5, 1929.

1,700,756

UNITED STATES PATENT OFFICE.

JEAN ALTWEGG AND ANNE-MARIE DUTEL, OF LYON, FRANCE, ASSIGNORS TO SOCIETE DES USINES CHIMIQUES RHONE-POULENC, OF PARIS, FRANCE, A CORPORATION OF FRANCE.

DRY PROCESS OF MANUFACTURING CALCIUM ARSENITE.

No Drawing. Application filed January 29, 1927, Serial No. 164,652, and in France July 29, 1926.

This invention relates to a process of manufacturing pulverulent calcium arsenite, the principal object of the invention being to provide a process by means of which addition of water to the ingredients is avoided thereby eliminating the necessity of drying the arsenite and then reducing it to a powder.

Heretofore, calcium arsenite has been obtained only by methods involving wet conditions. Some of these methods are based on the precipitation of the salt out of a mixture of a solution of a soluble arsenite, such for example, as an alkaline arsenite, and a solution of a soluble calcium salt, such as the chloride or nitrate of calcium. According to another method, a mixture of lime water with a solution of arsenious acid is prepared, or, more properly, milk of lime and powdered arsenious acid are stirred together while hot. The addition of water to a mixture of quicklime and arsenious acid has also been suggested, thus to obtain a paste of calcium arsenite. The disadvantage with all of these methods resides in the fact that it is almost impossible to produce directly a powder of sufficient fineness without grinding.

We have discovered that calcium arsenite in the form of an impalpable powder can be obtained directly by causing steam to act on a mixture of calcium oxide and arsenious acid (arsenic trioxide). In effect, we have discovered the surprising fact that the reaction between these two oxides takes place in the presence of steam without the mass passing through the paste state and that the final product turns out in the form of a perfectly pure powder containing no free arsenious acid whatever.

The manufacture can easily be rendered continuous, for example, by employing a rotary arrangement which admits a mixture of calcium oxide and arsenic trioxide at one side and steam at the other side on the principle of opposed currents.

For obtaining industrial products one may without difficulty employ the commercial quick lime and arsenic trioxide.

By choosing the quantities of the two ingredients in the proportion of three molecules of calcium oxide and one molecule of arsenic trioxide tricalcic ortho-arsenite is obtained. It is very easy to increase the quantity of lime, the arsenites thus obtained being basic arsenites containing an excess of calcium hydrate. As is known, arsenites of this kind are used commercially for the manufacture of calcium arsenate for agricultural purposes by the well known processes of direct oxidation by means of atmospheric oxygen.

The technical advance represented by this novel method of manufacturing calcium arsenite is self evident, namely, the delicate operations of drying and pulverizing the product are thereby avoided.

The products obtained by this novel process are impalpable and adapted for numerous uses, among which may be mentioned their employment as an insecticide in agriculture and as intermediate materials in the manufacture of arsenites.

Having thus described our invention, what we claim is:

1. The process of manufacturing pulverulent calcium arsenite which consists in forming a dry mixture of calcium oxide and arsenic trioxide and causing a current of dry steam to pass over said mixture.

2. The process of manufacturing dry pulverulent calcium arsenite which consists in forming a dry mixture of calcium oxide and arsenic trioxide in the proportions of three molecules of the former to one molecule of the latter, and subjecting the mixture to the action of a current of dry steam.

3. The process of manufacturing dry calcium arsenite which consists in introducing a dry mixture of calcium oxide and arsenic trioxide into a receptacle at one side thereof and simultaneously introducing a current of dry steam into the receptacle at the opposite side thereof.

In testimony whereof we have signed our names to this specification.

JEAN ALTWEGG.
ANNE-MARIE DUTEL.